E. J. PEARSON.
FERTILIZER DISTRIBUTER.
APPLICATION FILED MAY 14, 1913.
1,079,509.
Patented Nov. 25, 1913.
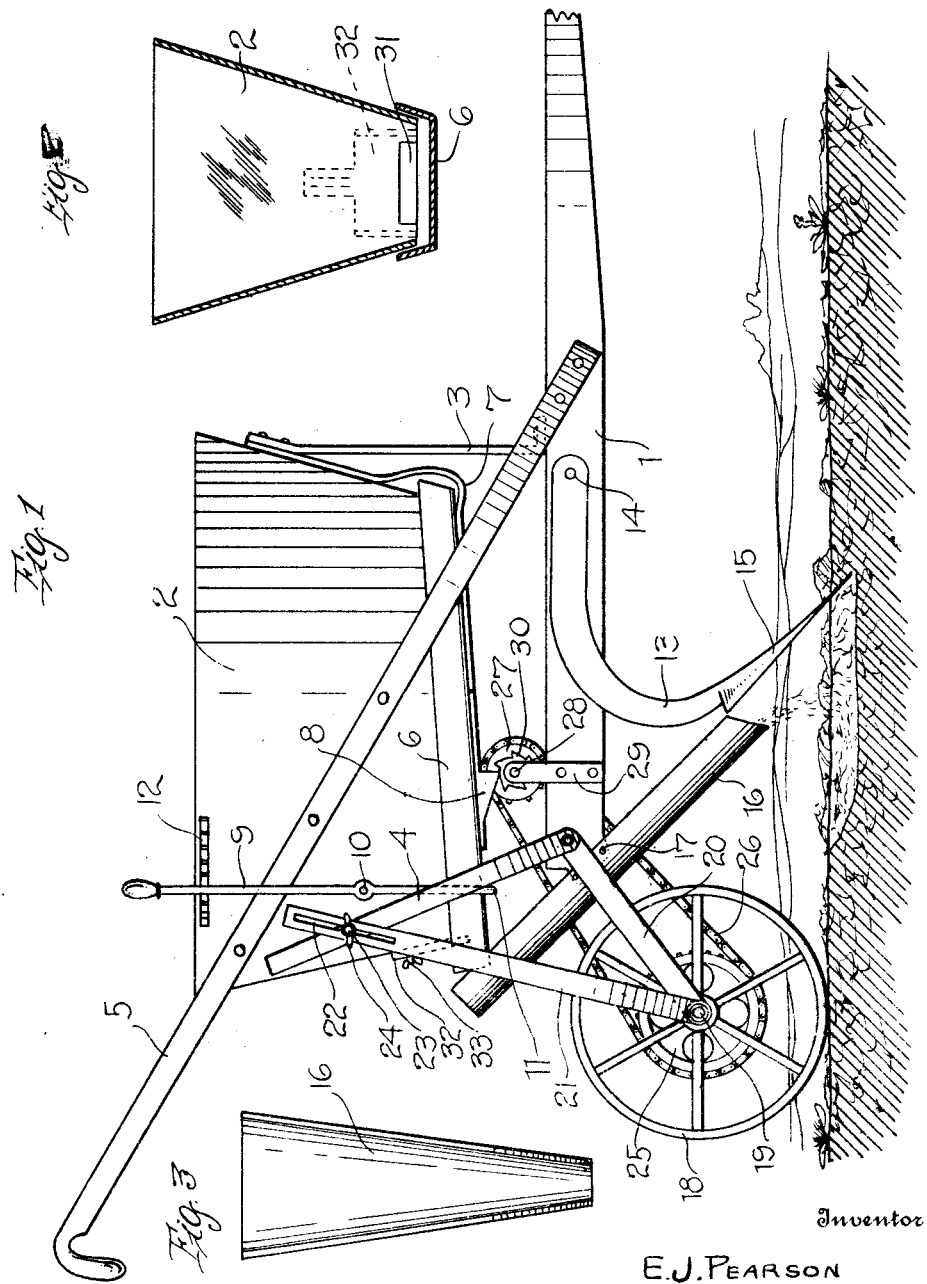
Inventor
E. J. Pearson
By Watson E. Coleman
Attorney
Witnesses
Robert M. Sutphen
V. J. Cowrick

UNITED STATES PATENT OFFICE.

EDWARD J. PEARSON, OF AUSTIN, ARKANSAS.

FERTILIZER-DISTRIBUTER.

1,079,509.      Specification of Letters Patent.      Patented Nov. 25, 1913.

Application filed May 14, 1913. Serial No. 767,730.

*To all whom it may concern:*

Be it known that I, EDWARD J. PEARSON, a citizen of the United States, residing at Austin, in the county of Lonoke and State of Arkansas, have invented certain new and useful Improvements in Fertilizer-Distributers, of which the following is a specification, reference being had to the accompanying drawings.

This invention comprehends certain new and useful improvements in fertilizer distributers and has for its primary object to provide a device of this character which will be of improved construction and which will have improved and novel mechanism for controlling the discharge of the fertilizer from the hopper to the distributing spout.

Another object is to provide a distributer of this character which will be provided with a resiliently supported hopper bottom in the form of a trough and having a lug upon one face and means for engaging the lug and forcing the same upwardly to give movement to the hopper bottom and agitate the material upon the same to force said material to move rearwardly and off of the rear end of the bottom and drop into the distributing spout.

A further object is to generally improve and simplify the construction and operation of implements of this character and increase the efficiency of the same.

With the above and other objects in view, my invention consists in certain novel constructions, combinations, and arrangements of parts to be hereinafter more fully described, claimed and illustrated in the accompanying drawings, in which, Figure 1 is a side elevational view of my improved fertilizer distributer; Fig. 2 is a vertical transverse section through the hopper and movable bottom, showing in dotted lines the cut-off or gage door adjustably mounted upon the outer face of the rear end of the hopper; and Fig. 3 is a detail elevational view of the distributing spout removed.

Referring more specifically to the drawings, in which similar reference characters designate corresponding parts throughout the several views, 1 designates the beam to which suitable draft animals may be connected and 2 the hopper supported above the beam 1 by means of the forward members 3 and the rear braces 4. The hopper 2 is further braced and strengthened by means of the rearwardly directed parallel handles 5 which have their lower ends secured to the beam 1 while said handles are secured intermediate of their length to the sides of the hopper, the rear ends of the handles extending rearwardly of said hopper, as will be clearly understood by referring to the drawings.

The hopper 2 may be of any form desired but is preferably of rectangular form as shown in the drawings and has the trough bottom 6 positioned therebeneath and resiliently retained in normal position by means of the leaf spring 7 which has its central portion bowed outwardly while one end is secured to the front of the hopper 2 while the opposite end is secured longitudinally to the under face of the bottom 6, the ratchet pawl 8 being formed upon the last mentioned end of the spring 7, the purpose of which will presently appear. The height of the rear end of the bottom 6 is regulated by means of the lever 9 which is pivoted to the outer face of one side of the hopper 2, as shown at 10, and which has its lower end bent at a right angle and extended transversely beneath the bottom 6, as shown at 11. The upper end of the lever 9 is engaged with the teeth of the rack 12 secured to the upper edge of said side of the hopper, whereby the lever may be readily secured in proper position to adjust the height of the rear end of the bottom 6, as desired.

The curved standard 13 is secured at its upper end to the beam 1, as shown at 14 while its lower end 15 is preferably in the form of a blade forming the furrow in front of the distributing spout 16, which preferably gradually increases in size toward its upper end, into which upper end extends the rear end of the bottom 6. It will be understood that the spout 16 is secured to the rear end of the beam 1, as shown at 17.

The ground wheel 18 is mounted upon the shaft 19 carried in the overlapped lower ends of the supporting bracket arms 20 and 21. The upper ends of the supporting bracket arms 20 are pivoted to the sides of the beam 1, preferably by means of the same bolt which secures the lower ends of the rear braces 4 to said beam. The upper ends of the supporting bracket arms 21, however, are provided with longitudinal elongated slots 22 through which are engaged the ends of bolts 23 projecting laterally from the upper portions of the rear braces 4 and having adjusting nuts 24 threaded thereon and adapted for binding engagement against the supporting bracket arms 21 to retain the upper ends thereof in proper adjusted position. It will be clearly seen that by securing the upper ends of the bracket supporting arms 21 in this manner, the wheel 18 may be readily raised or lowered as desired with respect to the beam 1 and hopper 2.

A sprocket wheel 25 is also mounted upon the shaft 19 and has engaged therearound the sprocket chain 26 which is also engaged around a sprocket wheel 27 mounted upon a shaft 28 which is rotatably mounted in the bracket 29 extending upwardly from the beam 1, adjacent the rear end thereof. A ratchet wheel 30 is also mounted upon the shaft 28 and the teeth of said ratchet wheel engage the ratchet pawl 8 as the shaft 28 and wheel 30 are rotated, thereby causing continual raising and lowering of the bottom 6, and agitating the material upon said bottom and causing the same to move rearwardly and off of the rear end of said bottom and travel downwardly in the distributing spout 16 to be distributed or discharged from the lower end of said spout. The rear end of the hopper 2 is provided with a suitable opening 31 at its lower edge, over which opening is adjustably positioned the cut-off or gage door 32 which may be readily adjusted and secured in adjusted position, as shown at 33 to regulate the discharge of the material from the rear end of the bottom 6, as will be clearly apparent.

From the foregoing it will be readily seen that I have provided a distributer which may be employed for distributing fertilizer material, etc., and which will be of extremely simple construction and operation and highly efficient and effective in use. It will further be apparent that should any of the parts become worn or broken, they may be readily and cheaply replaced.

While I have shown the preferred embodiment of my invention, it will be understood that minor changes in the details of construction may be made within the scope of the appended claim without departing from the spirit of my invention.

What I claim is:—

A fertilizer distributer comprising a beam, a hopper above the beam, means for rigidly supporting said hopper above the beam, a trough bottom spaced below the hopper, means connected with the hopper and the bottom for resiliently retaining the latter in normal position, a ground wheel, means for adjustably supporting the ground wheel below the beam, a pawl carried by the bottom, a ratchet wheel engaged with the pawl, and connections between the ground wheel and the ratchet wheel whereby the trough bottom will be agitated to cause material resting upon the same to travel to the rear end thereof, and a spout at the rear end of the trough bottom to receive material from the latter.

In testimony whereof I hereunto affix my signature in the presence of two witnesses.

EDWARD J. PEARSON.

Witnesses:
K. T. PEARSON,
W. F. GALLOWAY.